United States Patent [19]

Huffer

[11] Patent Number: 4,902,081
[45] Date of Patent: Feb. 20, 1990

[54] LOW EMISSIVITY, LOW SHADING COEFFICIENT LOW REFLECTANCE WINDOW

[75] Inventor: Russell Huffer, Owatonna, Minn.
[73] Assignee: Viracon, Inc., Owatonna, Minn.
[21] Appl. No.: 53,033
[22] Filed: May 22, 1987
[51] Int. Cl.$^4$ .............................................. G02B 5/28
[52] U.S. Cl. ..................................... 350/1.7; 350/166
[58] Field of Search ................... 350/1.7, 166, 1.6, 164

[56] References Cited

U.S. PATENT DOCUMENTS

| | | | |
|---|---|---|---|
| 4,098,956 | 7/1978 | Blickensderfer et al. | 428/627 |
| 4,180,954 | 1/1980 | Gell, Jr. | 350/1.7 X |
| 4,462,883 | 7/1984 | Hart | 204/192 C |
| 4,497,700 | 2/1985 | Groth et al. | 204/192 P |
| 4,515,151 | 5/1985 | Slemmons et al. | 126/417 X |
| 4,548,691 | 10/1985 | Dietrich et al. | 204/192 P |
| 4,610,771 | 9/1986 | Gillery | 204/192.1 |

Primary Examiner—Rodney B. Bovernick
Assistant Examiner—Terry S. Callaghan
Attorney, Agent, or Firm—Steven E. Kahm

[57] ABSTRACT

A low emissivity, low shading coefficient, low reflectance window consisting of two panes of glass. The first pane having a low wave infrared reflecting and a visible light and short wave infrared absorbing section of coatings on its inside surface. A second pane spaced about one half inch from the inside surface of the first pane to protect the coatings on the first pane and to insulate the room form the heat generated on the light and heat absorbing coating of the first pane. The infrared reflecting section consisting of four layers of metals and metal oxides. The first layer of metal oxides selected from the group consisting of tin oxide, zinc oxide and a combination of zinc and tin oxide. The second layer is silver. The third layer consisting of a metal selected from the group consisting of aluminum, titanium, zinc and tin. The fourth layer selected from the same group as the first layer. The visible light and short wave infrared absorbing section consists of a coating of titanium nitride.

4 Claims, 1 Drawing Sheet 4,902,081

LOW EMISSIVITY, LOW SHADING COEFFICIENT LOW REFLECTANCE WINDOW

BACKGROUND OF THE INVENTION

In the past few years, low emissivity windows, which allow short wave energy to be transmitted through glass but reflect long wave (infrared) energy, have become very popular on new buildings. These windows are popular because they can save a great deal of money on heating and cooling costs. By reflecting the long wave infrared energy on the outside of the window in the summer radiant heat can not get into the building, therefore the window helps to keep cooling costs down. In the winter, by reflecting the infrared energy on the inside of the window, heat can not escape as easily, therefore the window helps to keep heating costs down.

These low emissivity windows are very efficient for keeping out long wave infrared radiation but transmit a high percentage of visible light and solar short wave infrared radiation which also heat up a room in the summer increasing cooling costs.

In the past highly reflective windows were used to keep the visible and short wave infrared radiation out. Unfortunately reflecting visible light and short wave infrared radiation on the outside of the window causes a radiation pollution of the immediate environment. In cities the building across from or next to the building with these highly reflective windows gets a lot of unwanted radiation heating the building. This is especially pronounced in modern all glass exterior buildings. This visible light and short wave infrared radiation pollution is also responsible for radiation burning and thus killing vegetation near the building. Because of these problems some cities are forbidding the use of this type of glass despite the advantages of lowered energy use. There is a need for a non reflecting low emissivity glass that will not pollute the environment with reflected visible light radiation and yet keep a substantial portion of the visible solar light and short wave heat from entering and heating a room.

SUMMARY OF THE INVENTION

The invention disclosed herein is a low emissivity window with the addition of a layer of Titanium Nitride which absorbs a large portion of the visible light radiation and short wave infrared radiation incident on it and changes the energy of the visible light and short wave infrared radiation into long wave heat. It then transmits the long wave heat energy by conducting the heat through the low emissivity windows metallic layers to the window itself which becomes hot. The heat energy is then conducted and radiated away from the windows surface. The heat from the windows surface is radiated away at the characteristic frequency of the glass which is a harmless infrared frequency, thus eliminating the problem of visible light pollution.

DESCRIPTION OF THE PREFERRED EMBODIMENT

Figure 1:
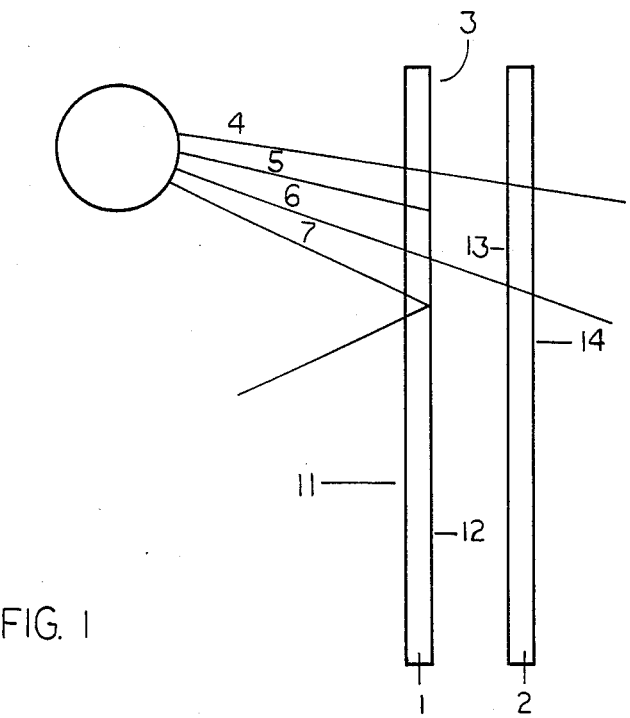
FIG. 1 is a side view of the window showing the incident radiation from the sun.

FIG. 1 shows a window having two pains of glass with a space in between.

Pane 1 is the outside pane. It has an outside surface 11 and an inside surface 12.

The inside surface 12 has a coating 3 consisting of four layers of metals and metal oxides to form a low emissivity barrier to infrared long wave heat while transmitting visible light.

The inside surface 12 also has a visible light and solar heat absorbing coating of titanium nitride in a layer on top of the low emissivity layers.

There is a gap of approximately one half inch between pane 1 and pane 2. Pane 2 has outside surface 13 and inside surface 14.

Pane 1 and pane 2 may be either clear or tinted, annealed or heat treated glass.

Figure 2:
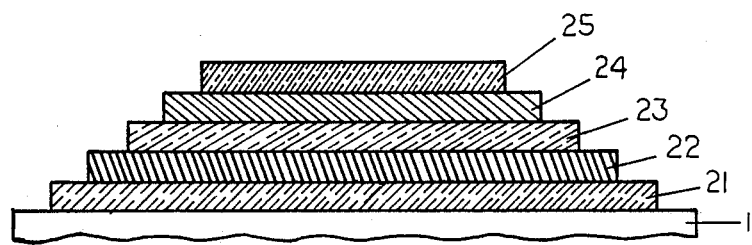
FIG. 2 is a cross section showing the layers of metals on a glass substrate.

FIG. 2 shows a cross section of the coatings 3 on the inside surface 12 of pane 1.

Each layer is sputtered on to the window in layers that are only a few angstroms thick.

There are two sections of coatings. The first coating section is the low emissivity section. This section reflects long wave infrared radiation and transmits visible light radiation and short wave infrared heat. In the Applicant's preferred embodiment layers 21, 22, 23 and 24 compose the low emissivity coating.

The second coating section is the low shading coefficient coating. It consists of layer 25 which is a visible light and short wave infrared heat absorbing layer. It absorbs a large percentage of the visible light and short wave infrared heat radiation and converts energy thus absorbed to long wave infrared heat energy.

In the Applicant's preferred embodiment the low emissivity coating is composed of four layers. Layer 21 is composed of a metal oxide chosen from the group Tin Oxide, Zinc Oxide, or a mixture of Tin and Zinc Oxide. Layer 22 is preferably silver. Layer 23 is chosen from either Aluminum, Zinc, Titanium or Tin. Layer 24 is composed of a metal oxide chosen from the group Tin Oxide, Zinc Oxide, or a mixture of Tin and Zinc Oxide.

The second coating section, layer 25, consists of Titanium Nitride. The Titanium Nitride absorbs light in the visible spectrum and short wave infrared heat and converts the energy absorbed to long wave infrared heat. The heat is conducted through layers 24, 23, 22 and 21 without damaging these layers to the pane 1. The pane absorbs the heat and dissipates the heat from the outside surface 11 by radiating the heat away in the form of infrared radiation and by the heat being conducted away by the air incident on the surface of the pane.

The glass pane 1 acts like a heat sink to the layers 21, 22, 23, 24, and 25. Glass is heavy and can absorb a lot of energy. The glass will heat up as the sun load increases during the day. The outside surface 11 of pane 1 will become hot to the touch, 180 degrees fahrenheit or more, depending on the sun load, the wind, humidity, air density, outside temperature and other conditions.

The infrared radiation from the outside surface 11 of pane 1 is impeded from entering the building because of the low emissivity coating on the inside surface 12 of pane 1.

In inside pane 2 is separated from pane 1 by approximately one half inch of air which is a good insulator. This helps the inside surface 14 of pane 2 remain at or close to the ambient temperature of the room, usually about 75 degrees fahrenheit.

Referring to FIG. 1 it is seen that sunlight is represented by rays 4, 5, 6, and 7.

Ray 4 is visible light and represents the light that gets through the windows and enters the room. The visible light that is transmitted through this type of window was found to vary from 24% to 48% of the incident visible light and 4% to 14% of the incident solar infrared energy depending on the color of the tinted annealed glass used. If clear annealed glass was used 48% of the visible light and 14% of the solar infrared heat were transmitted. If no coatings were used approximately 81% of the light and 80% of the solar infrared energy would be transmitted. Thus the light and short wave infrared heat entering and heating the room is substantially lower using the invention.

Ray 5 shows a visible light ray being stopped by the light absorbing coating layer 25 on the inside surface 12 of pane 1 and converted to heat energy.

Ray 6 shows a ray on infrared energy transmitted through panes 1 and 2. Measurements show that 87% of the infrared radiation is transmitted into the room. This 87% rate is a constant dependent on the tint of the glass used.

Ray 7 shows a ray of infrared energy reflected from the layers of the infrared reflecting coating section on surface 12 of pane 1. The coatings 21, 22, 23 and 24 reflect about 13% of the incident infrared rays. A typical low emissivity window will transmit 70 to 80% of the incident visible light and about 87% of the infrared light. The Applicant's improved low emissivity window, by the addition of the visible light and infrared heat absorbing layer of Titanium Nitride, will transmit 24 to 48% of the visible light and 4 to 13% of the infrared heat thus lowering the cooling costs of a building employing his windows.

I claim:

1. A low emissivity, low shading coefficient, low reflectance window consisting of an outside pane of glass having an inside surface and an outside surface, and an inside pane of glass having an inside surface and an outside surface, the outside pane of glass having a space between it and the inside pane of glass,
   the inside surface of the outside pane of glass having an infrared reflecting coating having a plurality of layers of metal and metal oxides forming a low emissivity coating on the glass, to reflect long wave infrared radiation and transmit visible radiation and short wave infrared radiation,
   a visible light absorbing coating on the infrared reflecting coating having a metal nitride layer to absorb the visible light energy and short wave infrared energy and convert it to heat energy which is conducted through the low emissivity coating to the outside pane, where said heat energy can be conducted and radiated away.

2. A low emissivity, low shading coefficient, low reflectance window as in claim 1 where the low emissivity coating consists of a first layer of metal oxides selected from the group consisting of tin oxide, zinc oxide and a combination of zinc and tin oxide, applied to the glass,
   a second layer of silver,
   a third layer of consisting of a metal selected from the group consisting of aluminum, titanium, zinc and tin,
   a fourth layer of metal oxides selected from the group consisting of tin oxide, zinc oxide and a combination of zinc and tin oxide.

3. A low emissivity, low shading coefficient, low reflectance window as in claim 2 where the visible light absorbing coating is a layer of titanium nitride.

4. A low emissivity, low shading coefficient, low reflectance window as in claim 3 where the inside and outside panes of glass are annealed or heat treated glass and spaced approximately one half inch apart.

* * * * *